US012634188B2

(12) United States Patent
Kim et al.

(10) Patent No.: US 12,634,188 B2
(45) Date of Patent: May 19, 2026

(54) ELECTRONIC DEVICE FOR MODELING NON-LINEAR MEMORY SYSTEM AND OPERATION METHOD THEREFOR

(71) Applicant: SAMSUNG ELECTRONICS CO., LTD., Suwon-si (KR)

(72) Inventors: Sumin Kim, Suwon-si (KR); Hyung Sun Lim, Suwon-si (KR); Hongmin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 18/348,927

(22) Filed: Jul. 7, 2023

(65) Prior Publication Data

US 2024/0106692 A1    Mar. 28, 2024

(30) Foreign Application Priority Data

Sep. 16, 2022    (KR) ........................ 10-2022-0117370

(51) Int. Cl.
*H04L 27/36* (2006.01)
*H04B 1/40* (2015.01)

(52) U.S. Cl.
CPC ............. *H04L 27/366* (2013.01); *H04B 1/40* (2013.01)

(58) Field of Classification Search
CPC ........... H03F 1/3282; H03F 2201/3209; H04L 27/366; H04B 1/40
See application file for complete search history.

(56) References Cited

U.S. PATENT DOCUMENTS

| | | | | | |
|---|---|---|---|---|---|
| 6,476,670 | B2 * | 11/2002 | Wright | .................. | H03F 1/3247 |
| | | | | | 330/136 |
| 7,149,257 | B2 * | 12/2006 | Braithwaite | .......... | H03F 1/3247 |
| | | | | | 375/296 |
| 7,583,754 | B2 * | 9/2009 | Liu | ........................ | H03F 1/3258 |
| | | | | | 375/295 |
| 8,989,307 | B2 * | 3/2015 | Zhou | ..................... | H03F 1/3258 |
| | | | | | 375/221 |
| 9,225,501 | B2 * | 12/2015 | Azadet | .................. | H04L 5/1461 |
| 9,584,165 | B2 * | 2/2017 | Okazaki | .................. | H03F 3/245 |
| 11,082,013 | B2 * | 8/2021 | Maa | ...................... | H03F 1/0211 |

(Continued)

FOREIGN PATENT DOCUMENTS

JP          6720697          6/2020

OTHER PUBLICATIONS

"AM/AM AM/PM Estimation on IEEE 802.11a Packet with OFDM Demodulator"; Hsu et al.; 83rd ARFTG Microwave Measurement Conference; 2014 (Year: 2014).*

(Continued)

*Primary Examiner* — Benjamin H Elliott, IV
(74) *Attorney, Agent, or Firm* — Morgan, Lewis & Bockius LLP

(57) ABSTRACT

An electronic device includes a processor that converts AM-AM data and AM-PM data into complex domains for each of a plurality of different amplitudes to acquire a plurality of preprocessed data parts, converts the plurality of preprocessed data parts into a time domain to generate a plurality of filters for each of a plurality of different amplitudes, generates an output signal by performing a convolution on an input signal with the plurality of filters, and models a non-linear memory system using the input signal and the output signal.

15 Claims, 8 Drawing Sheets

(56)  References Cited

U.S. PATENT DOCUMENTS

| | | | |
|---|---|---|---|
| 2001/0050592 A1* | 12/2001 | Wright | H03F 1/3294 |
| | | | 330/149 |
| 2002/0008578 A1* | 1/2002 | Wright | H03F 1/3241 |
| | | | 330/149 |
| 2008/0057882 A1* | 3/2008 | Singerl | H03F 1/3258 |
| | | | 455/115.1 |
| 2008/0133982 A1* | 6/2008 | Rawlins | H04B 1/0475 |
| | | | 714/699 |
| 2008/0246475 A1* | 10/2008 | Adachi | G01R 33/56572 |
| | | | 324/307 |
| 2012/0280749 A1* | 11/2012 | Kumar | H03F 1/3294 |
| | | | 330/149 |
| 2013/0031442 A1* | 1/2013 | Rawlins | H03F 1/3294 |
| | | | 714/763 |
| 2022/0115991 A1* | 4/2022 | Choi | H03F 3/189 |
| 2024/0106692 A1* | 3/2024 | Kim | H04B 1/40 |

OTHER PUBLICATIONS

"On the Continuous-Time Model for Nonlinear-Memory Modeling of RF Power Amplifiers"; Ngoya et al.; IEEE Transactions on Microwave Theory and Techniques, vol. 57, No. 12, Dec. 2009 (Year: 2009).*

* cited by examiner

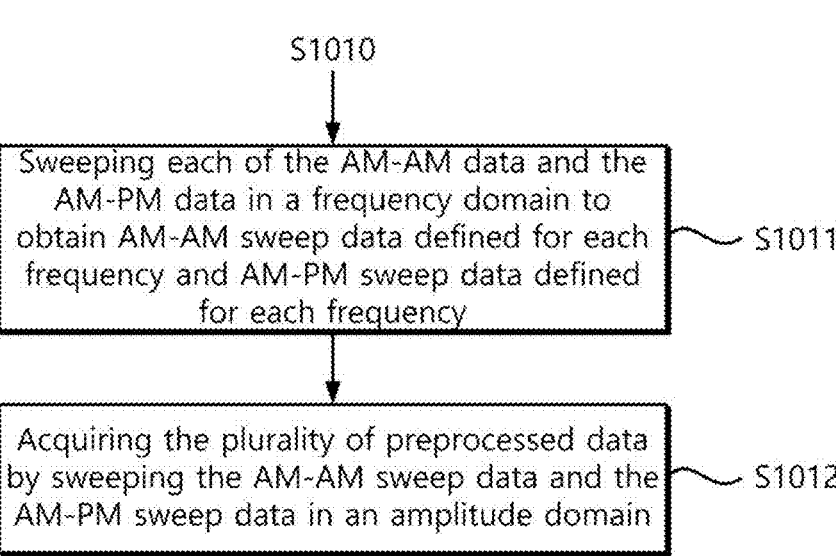

Sweeping each of the AM-AM data and the AM-PM data in a frequency domain to obtain AM-AM sweep data defined for each frequency and AM-PM sweep data defined for each frequency — S1011

Acquiring the plurality of preprocessed data by sweeping the AM-AM sweep data and the AM-PM sweep data in an amplitude domain — S1012

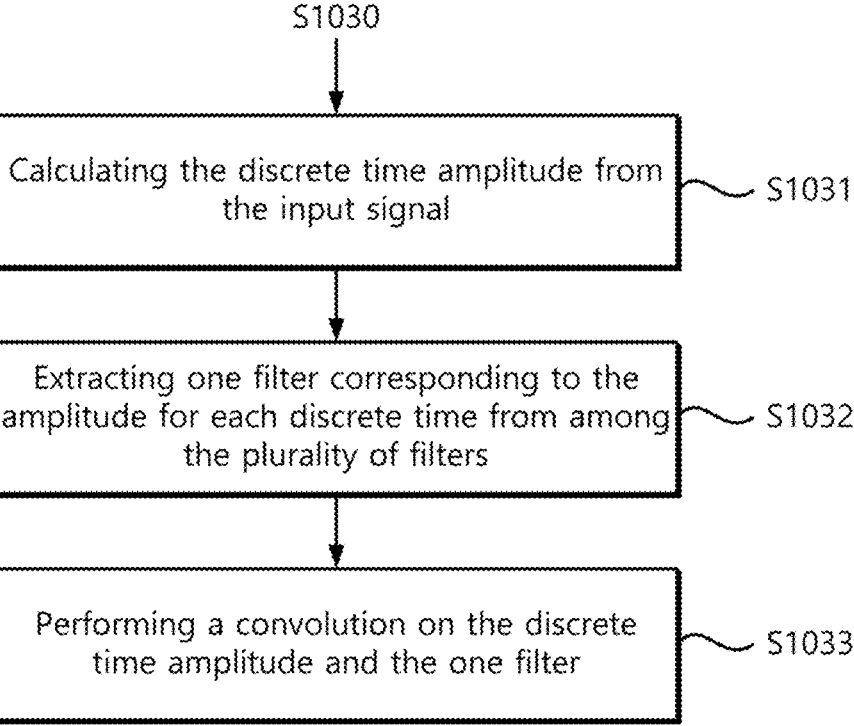

Calculating the discrete time amplitude from the input signal — S1031

Extracting one filter corresponding to the amplitude for each discrete time from among the plurality of filters — S1032

Performing a convolution on the discrete time amplitude and the one filter — S1033 x[n] — PD 220 — z[n] — PA 240 — y[n]

PD Identifier 260

Data Preprocessing Unit 120

Filter Generating Unit 140

Modeling Unit 160

100

2

3

Processor 320

Transceiver 310

ELECTRONIC DEVICE FOR MODELING NON-LINEAR MEMORY SYSTEM AND OPERATION METHOD THEREFOR

CROSS-REFERENCE TO RELATED APPLICATIONS

This U.S. nonprovisional patent application claims priority under 35 U.S.C. § 119 to Korean Patent Application No. 10-2022-0117370, filed on Sep. 16, 2022 in the Korean Intellectual Property Office, the disclosure of which is incorporated by reference in its entirety herein.

1. Technical Field

Embodiments of the present disclosure relate to an electronic device for modeling a non-linear memory system and an operation method therefor.

2. Discussion of Related

A non-linear system, unlike a linear system, does not satisfy the principle of superposition, so the relationship between input and output is non-linear. A power amplifier (PA) included in a radio frequency (RF) transceiver is an example of a non-linear system. A distortion may occur in an output of the power amplifier that includes a non-linear element such as a transistor. In addition, since the output of the power amplifier is affected by past input stored by the system, the power amplifier may also be classified as a memory system having a memory effect.

A memory polynomial (MP) model may be used to model a non-linear system including a power amplifier and a memory system. Coefficients constituting the MP may be learned using a training process and a training data set. However, the coefficients produced during the training may have poor quality due to overfitting, the quality of the training data set, or the configuration of the training data set.

SUMMARY

Embodiments of the present disclosure provide an electronic device capable of generating and modeling an output signal of a non-linear memory system without requiring an actual output from the non-linear memory system, and an operating method therefor.

According to an embodiment of the present disclosure, an electronic device includes a processor that converts AM-AM data and AM-PM data into complex domains for each of a plurality of different amplitudes to acquire a plurality of preprocessed data parts, converts the plurality of preprocessed data parts into a time domain to generate a plurality of filters for each of a plurality of different amplitudes, performs a convolution on an input signal with the plurality of filters to generate an output signal, and models a non-linear memory system using the input signal and the output signal.

According to an embodiment, the processor may sweep each of the AM-AM data and the AM-PM data in a frequency domain to acquire AM-AM sweep data defined for each of a plurality of different frequencies and AM-PM sweep data for each of the frequencies, and may sweep the AM-AM sweep data and the AM-PM sweep data in an amplitude domain to acquire the plurality of preprocessed data parts.

According to an embodiment, the processor may convert the plurality of preprocessed data parts into the time domain through an Inverse Fast Fourier Transform (IFFT).

According to an embodiment, the processor may calculate an amplitude for each discrete time from the input signal, may extract one filter corresponding to the amplitude for the each discrete time from among the plurality of filters, and may perform a convolution on the amplitude for the each discrete time and the one filter.

According to an embodiment, the plurality of filters may be Finite Impulse Response) (FIR) filters.

According to an embodiment, the AM-AM data and the AM-PM data may be acquired from a signal of a one-tone frequency.

According to an embodiment of the present disclosure, a method for modeling a non-linear memory system includes: acquiring a plurality of preprocessed data parts by converting AM-AM data and AM-PM data into complex domains for each of a plurality of different amplitudes, generating a plurality of filters defined for each of the amplitudes by converting the plurality of preprocessed data parts into a time domain, generating an output signal by performing a convolution on an input signal with the plurality of filters, and modeling the non-linear memory system using the input signal and the output signal.

According to an embodiment, the acquiring of the plurality of preprocessed data may include sweeping each of the AM-AM data and the AM-PM data in a frequency domain to acquire AM-AM sweep data for each of a plurality of different frequencies and AM-PM sweep data for each of the frequencies, and acquiring the plurality of preprocessed data parts by sweeping the AM-AM sweep data and the AM-PM sweep data in an amplitude domain.

According to an embodiment, the modeling of the non-linear memory system may include calculating an amplitude for each discrete time from the input signal, extracting one filter corresponding to the amplitude for the each discrete time from among the plurality of filters, and performing a convolution on the amplitude for the each discrete time and the one filter.

According to an embodiment of the present disclosure, an electronic device includes a transceiver, and a processor connected with the transceiver, and the processor is configured to acquire a plurality of preprocessed data parts by converting AM-AM data and AM-PM data into complex domains for each of a plurality of different amplitudes, to generate a plurality of filters for each of the amplitudes by converting the plurality of preprocessed data parts into a time domain, to generate an output signal of the transceiver by performing a convolution on an input signal with the plurality of filters, and to model a non-linear memory system using the input signal and the output signal.

The AM-AM data may represent magnitudes of input signals and output signals and the AM-PM data may represent the magnitudes of the input signals and phases of the output signals. For example, the AM-AM data may be some points from an AM-AM curve and the AM-PM data may be some points from an AM-PM curve.

BRIEF DESCRIPTION OF THE FIGURES

A detailed description of each drawing is provided to facilitate a more thorough understanding of the drawings referenced in the detailed description of the present disclosure.

FIG. 2 is a diagram illustrating an operation of a data preprocessing unit according to an embodiment of the present disclosure.

FIG. 3 is a diagram illustrating an operation of a filter generating unit according to an embodiment of the present disclosure.

FIG. 4 is a diagram illustrating an operation of a modeling unit according to an embodiment of the present disclosure.

FIG. 7 is a flowchart of a preprocessing operation according to an embodiment of the present disclosure.

FIG. 8 is a flowchart of a modeling operation according to an embodiment of the present disclosure.

DETAILED DESCRIPTION

Hereinafter, embodiments of the present disclosure are described in detail and clearly to such an extent that one of ordinary one skill in the art may implement the present disclosure.

Figure 1:
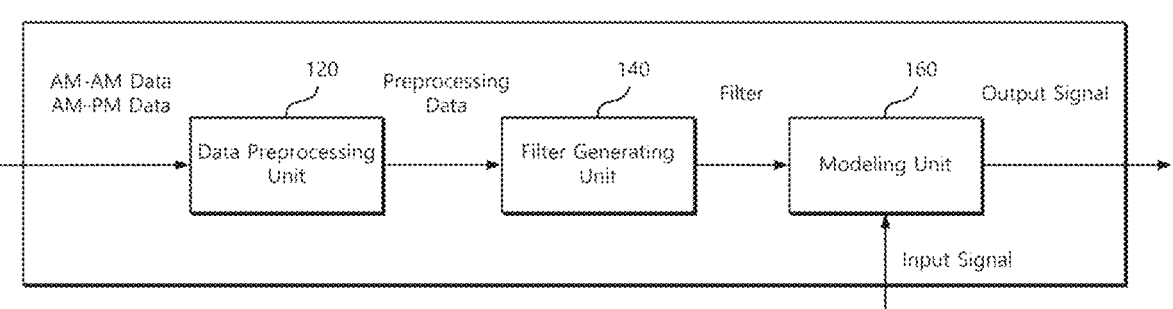
FIG. 1 is a diagram illustrating an electronic device according to an embodiment of the present disclosure.

FIG. 1 is a diagram illustrating an electronic device according to an embodiment of the present disclosure. The electronic device may be used to model the output signal generated by a non-linear memory system that includes one or more power amplifiers. For example, a pre-power amplifier may modulate an already phase-modulated input signal to generate composite modulated signal having a non-constant envelope for transmission through a power amplifier. The pre-power amplifier may exhibit nonlinear characteristics which can cause distortion of the amplitude modulation (AM) and/or phase modulation (PM) of the composite modulated signal.

Referring to FIG. 1, an electronic device 100 according to an embodiment of the present disclosure includes a data preprocessing unit 120, a filter generating unit 140, and a modeling unit 160. In an embodiment, the data preprocessing unit 120 is a processor, the filter generating unit 140 is a first logic circuit and the modeling unit 160 is a second logic circuit. In another embodiment, a single processor performs the functions of the data preprocessing unit 120, the filter generating unit 140, and the modeling unit 160.

The data preprocessing unit 120 preprocesses AM-AM data and AM-PM data to acquire a plurality of preprocessed data.

In an embodiment of the present disclosure, the AM-AM data is an AM-AM curve. The AM-AM curve has a magnitude of an input of any non-linear memory system on an x-axis and a magnitude of an output of any non-linear memory system on a y-axis. For example, a point of the AM-AM curve may indicate a voltage (or current) of an input signal input to a non-linear memory system including a power amplifier and a voltage (or current) of an output signal output from the non-linear memory system, the AM-AM curve may include several such points. In an embodiment, the AM-PM data is an AM-PM curve. The AM-PM curve has a magnitude of an input of any non-linear memory system on the x-axis and a phase of an output of any non-linear memory system on the y-axis. For example, a point of the AM-PM curve may indicate a voltage (or current) of an input signal input to the non-linear memory system and a phase voltage of an output signal output from the non-linear memory system, and the AM-PM curve may include several such points. Each of the AM-AM data and the AM-PM data may be understood as a set of data included in the AM-AM curve described above and a set of data included in the AM-PM curve described above. For example, the AM-AM data may include some points within the AM-AM curve and the AM-PM curve may include some points within the AM-PM curve.

In an embodiment, the AM-AM data and the AM-PM data may be extracted not only from a modulated signal, but also from a one-tone frequency signal, a two-tone frequency signal, or frequency signals having more than two-tones, which can be obtained from various simulators. In an embodiment, the AM-AM data and the AM-PM data are provided by a simulator. For example, a processor executing a simulator program may output the AM-AM data and the AM-PM data. The simulator program may have access to data on various different non-linear memory systems to simulate different AM-AM data and the AM-PM that conforms to a specification of the corresponding non-linear system.

The data preprocessing unit 120 may perform a preprocessing operation using a signal that is relatively uncomplicated compared with the modulated signal such as the one-tone frequency signal according to the above-described embodiment. The preprocessing operation of the data preprocessing unit 120 may mean converting the AM-AM data and the AM-PM data into a complex domain for each amplitude.

In an embodiment, the data preprocessing unit 120 may sweep the AM-AM data and the AM-PM data in a frequency domain to acquire AM-AM sweep data and AM-PM sweep data, which are defined for each frequency. In the present disclosure, a sweep means extracting or acquiring data for each preset step size within a preset period with respect to a certain parameter. Therefore, sweeping the AM-AM data and the AM-PM data in the frequency domain may be understood as extracting or acquiring the AM-AM data and the AM-PM data in units of specific frequency sweep with respect to any non-linear memory system.

According to an embodiment, a frequency sweep unit set for a sweep in the frequency domain may be set in various ways in consideration of resolution, accuracy, amount of computation, and storage space. For example, the frequency sweep unit may be set to a relatively low value to increase the resolution and the accuracy, and may be set to a relatively high value to reduce the amount of computation and the storage space.

Thereafter, the data preprocessing unit 120 may sweep the AM-AM sweep data and the AM-PM sweep data in an amplitude domain to finally acquire preprocessed data. Since the preprocessed data is acquired for each amplitude, the preprocessed data are a plurality of preprocessed data, and may be converted into the complex domains through sweeps in the frequency domain and sweeps in the amplitude domain.

Alternatively, according to an embodiment, the data preprocessing unit 120 may acquire the plurality of preprocessed data for each amplitude by directly converting the AM-AM data and the AM-PM data into the complex domains.

The filter generating unit 140 converts the plurality of preprocessed data for each amplitude acquired through the data preprocessing unit 120 into a time domain to generate a plurality of filters defined for each amplitude. In an embodiment, the filter generating unit 140 may transform the plurality of preprocessed data into the time domain through an inverse discrete Fourier transform (IDFT) or an inverse fast Fourier transform (IFFT). Since the plurality of filters are acquired from the plurality of preprocessed data defined for each amplitude, each of the filters may also be defined for each amplitude. Accordingly, the plurality of filters may serve to filter an arbitrary signal for each amplitude in the time domain. For example, the plurality of filters may be finite impulse response (FIR) filters or infinite impulse response (IIR) filters, which are impulse response filters.

The modeling unit 160 performs a convolution on an input signal with the plurality of filters to generate an output signal. The modeling unit models a non-linear memory system based on the input signal and the output signal. The input signal may be, for example, a modulated signal having a bandwidth.

The modeling unit 160 may first calculate an instantaneous amplitude from the input signal. The instantaneous amplitude may be calculated for each specific sample period in the time domain. Accordingly, a plurality of instantaneous signals having the instantaneous amplitude value for each discrete time may be acquired from the input signal.

The modeling unit 160 may generate a plurality of output signals by sequentially performing the convolution on the plurality of instantaneous signals with the plurality of filters in the time domain. For example, the modeling unit 160 searches for a filter corresponding to an instantaneous amplitude value of an arbitrary instantaneous signal among the plurality of filters. Since the plurality of filters are acquired through the sweep operation in the amplitude domain as described above, they may be provided for each amplitude value. Accordingly, the modeling unit 160 may search for one filter corresponding to the same amplitude value as the instantaneous amplitude value of the instantaneous signal. The modeling unit 160 may perform the convolution on the searched filter and the arbitrary instantaneous signal to generate convolution data, which is a result of one convolution. Thereafter, the modeling unit 160 may delay the convolution data by a specific sample period according to positions of the instantaneous signal in the discrete time domain.

The modeling unit 160 may generate a plurality of convolution data by performing the above-described convolution operation on the plurality of instantaneous signals acquired from the input signal. The modeling unit 160 may finally generate one output signal by adding all of the plurality of convolution data together. The modeling unit 160 may model the non-linear memory system based on the generated output signal and input signal. A non-linear memory system may be defined as a transfer function of the input signal and the output signal. For example, the modeling unit 160 may model the non-linear memory may determine a transfer function based on the input signal and the output signal. An actual non-linear memory including a power amplifier may then be later manufactured that satisfies the transfer function.

The electronic device 100 according to the above-described embodiment of the present disclosure enables modeling of the non-linear memory system using the AM-AM data and the AM-PM data obtainable through the simulator without a training operation required for an existing MP model. The existing MP model requires an actual output result associated with a non-linear memory system for a training operation, and thus an input signal also requires a complex modulated signal. But in an embodiment of the present disclosure, it is possible to model a non-linear memory system using the AM-AM data and the AM-PM data that are relatively uncomplicated and obtainable through a simulator without an actual output result. In addition, the present disclosure does not suffer from over-fitting, the quality of the training data set, or the difficulty of configuring the training data set.

Hereinafter, embodiments of more specific operations of the electronic device 100 of the present disclosure described above will be described.

Figure 2:
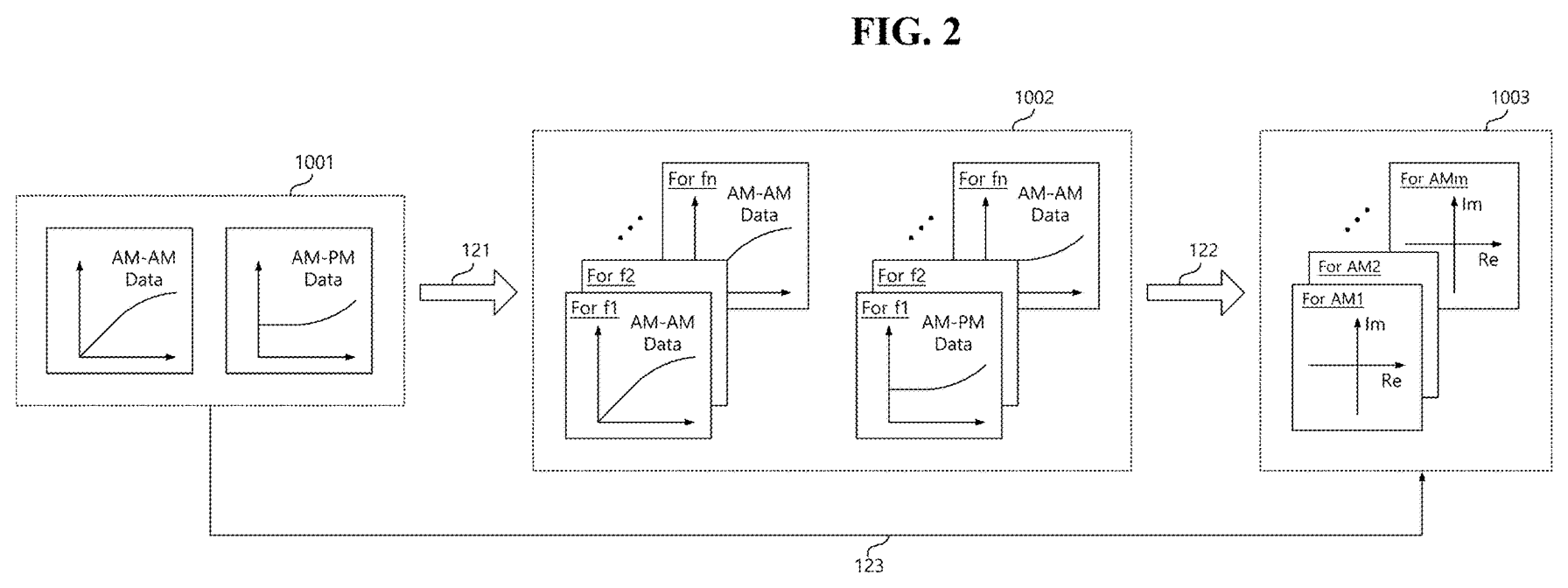

FIG. 2 is a diagram illustrating an operation of a data preprocessing unit according to an embodiment of the present disclosure.

Referring to FIG. 2, the data preprocessing unit 120 according to an embodiment first converts AM-AM data and AM-PM data 1001 into AM-AM sweep data and AM-PM sweep data 1002 through a sweep 121 in the frequency domain. The sweep 121 in the frequency domain may be performed for each preset frequency sweep unit with respect to a preset frequency period. FIG. 2 illustrates that the preset frequency period is set to 'n' (where 'n' is a natural number), but is not limited thereto. Accordingly, each of the AM-AM sweep data and AM-PM sweep data 1002 may include 'n' pieces of data. For example, there may be first pieces of AM-AM data for different frequencies f1, f2, . . . , fn and second pieces of AM-PM data for frequencies f1, f2, . . . , fn.

The AM-AM data and AM-PM data 1001 may be various types of data according to embodiments.

In an embodiment, the data preprocessing unit 120 may acquire the AM-AM sweep data and AM-PM sweep data 1002 from the AM-AM data and AM-PM data 1001 of a signal corresponding to a one-tone frequency.

Alternatively, in an embodiment, the data preprocessing unit 120 may acquire the AM-AM sweep data and AM-PM sweep data 1002 from the AM-AM data and AM-PM data 1001 of data obtained by averaging a modulated signal having an arbitrary frequency range bandwidth. Alternatively, according to an embodiment, the data preprocessing unit 120 may acquire the AM-AM sweep data and AM-PM sweep data 1002 from the AM-AM data and AM-PM data 1001 of data obtained by averaging signals measured from various frequencies, such as a one-tone or a multi-tone frequency, for example, a two-tone frequency.

As an embodiment, the AM-AM data and AM-PM data 1001 may be defined as in Equation 1.

$$f(x) = \sum_{p=0}^{\infty} a_p \cdot x^p \qquad \text{[Equation 1]}$$

Here, f(x) is a value corresponding to the output in the AM-AM data and AM-PM data 1001, $a_p$ is a coefficient of the Taylor series, and $x^p$ is a value corresponding to the input in the AM-AM data and AM-PM data 1001.

As an embodiment, the sweep 121 in the frequency domain for Equation 1 may be performed through Equation 2.

$$s(|x[n]|, f) \triangleq \sum_{p=0}^{K-1} a_p[f] \cdot |x[n]|^p \qquad \text{[Equation 2]}$$

Here, s(|x[n]|, f) is a value corresponding to the output of the AM-AM sweep data and AM-PM sweep data 1002, $a_p$[f] is a coefficient defined with respect to a frequency, and $|x[n]|^p$ is a value corresponding to the input of the AM-AM sweep data and AM-PM sweep data 1002.

Thereafter, the data preprocessing unit 120 acquires a plurality of preprocessed data 1003 defined in the complex domains for each amplitude through the sweep 122 in the amplitude domain with respect to the AM-AM sweep data and AM-PM sweep data 1002. The sweep 122 in the amplitude domain may also be performed for each preset amplitude sweep unit with respect to a preset amplitude period. FIG. 2 illustrates that the preset amplitude period is set to 'm' (where 'm' is a natural number), but is not limited thereto. For example, the sweep 122 may generate pieces of amplitude data for different amplitudes AM1, AM2, . . . , AMm.

According to an embodiment, the amplitude sweep unit set for a sweep in the amplitude domain may be set in various ways in consideration of resolution, accuracy, amount of computation, and storage space. For example, the amplitude sweep unit may be set to a relatively low value to increase the resolution and the accuracy, and may be set to a relatively high value to reduce the amount of computation and the storage space.

Alternatively, the data preprocessing unit 120 according to another embodiment may acquire the plurality of preprocessed data 1003 by directly converting (123) the AM-AM data and AM-PM data 1001 into the complex domains for each amplitude.

Figure 3:
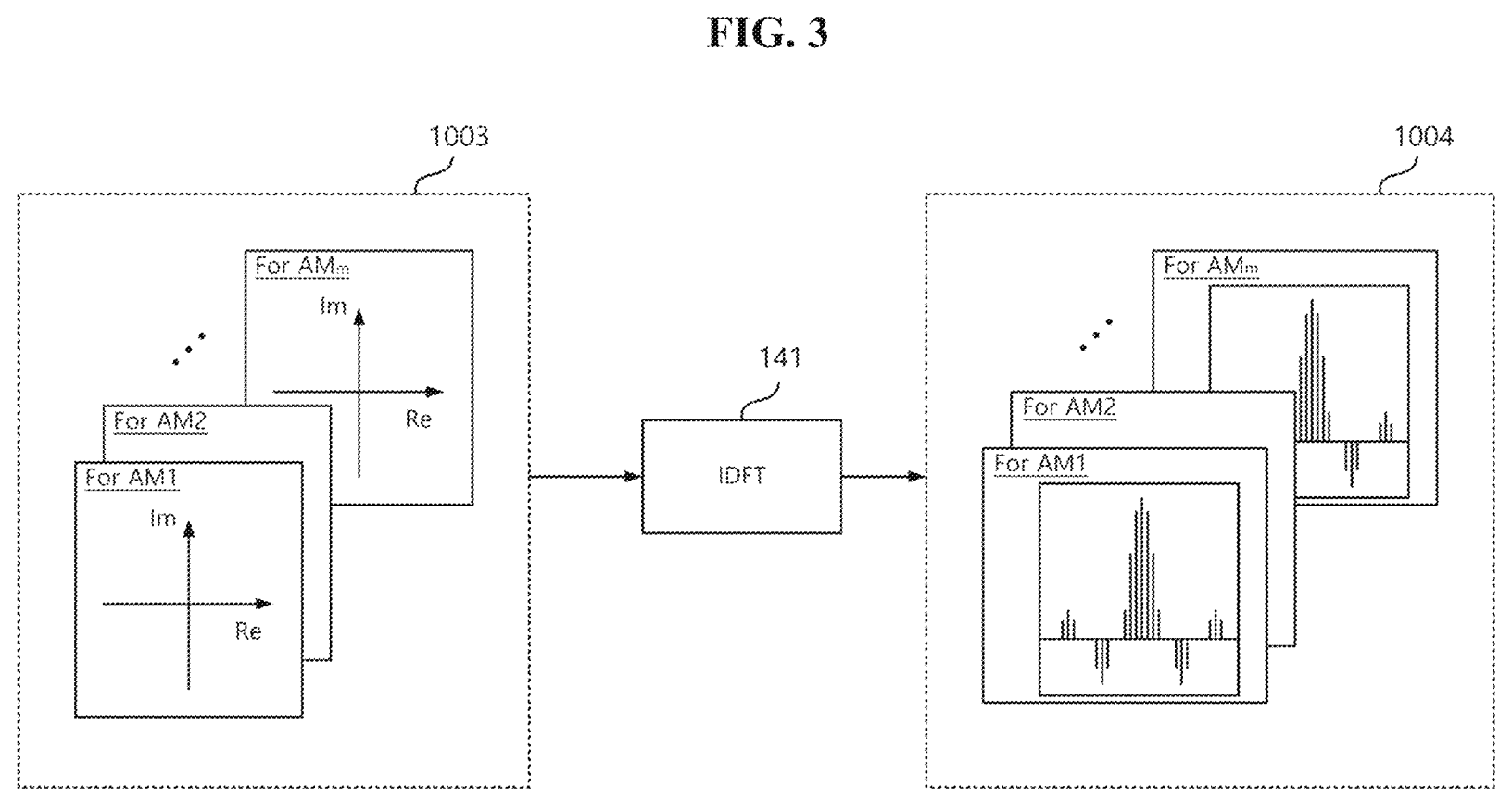

FIG. 3 is a diagram illustrating an operation of a filter generating unit according to an embodiment of the present disclosure.

Referring to FIG. 3, the filter generating unit 140 according to an embodiment may generate a plurality of filters 1004 by performing IDFT 141 on the plurality of preprocessed data 1003 acquired through the data preprocessing unit 120. The IDFT 141 may be performed on each of the plurality of preprocessed data 1003. The plurality of preprocessed data 1003 are data defined in the complex domain, but may be converted into the plurality of filters 1004 defined in the time domain through the IDFT 141.

In an embodiment, the IDFT 141 associated with the plurality of preprocessed data 1003 may be defined by Equation 3.

$$IDFT = \frac{1}{M} \sum_{f=0}^{M-1} S(|x[n-i]|, f) \cdot e^{j\left(\frac{2\pi f}{M}\right)i} \qquad \text{[Equation 3]}$$

Here, 'M' is the size of the sample, for example, it means the sample size of the plurality of preprocessed data 1003 in the frequency domain, and S(|x[n−i]|, f) is the expression in the frequency domain of Equation 2.

Alternatively, according to an embodiment, the filter generating unit 140 may generate the plurality of filters 1004 through the IFFT instead of the above-described IDFT 141. Alternatively, in an embodiment, when the plurality of filters 1004 are the FIR filters, the filter generating unit 140 may obtain coefficients of the FIR filters based on training or measuring a Linear Time Invariable (LTI) model defined depending on an input.

Figure 4:
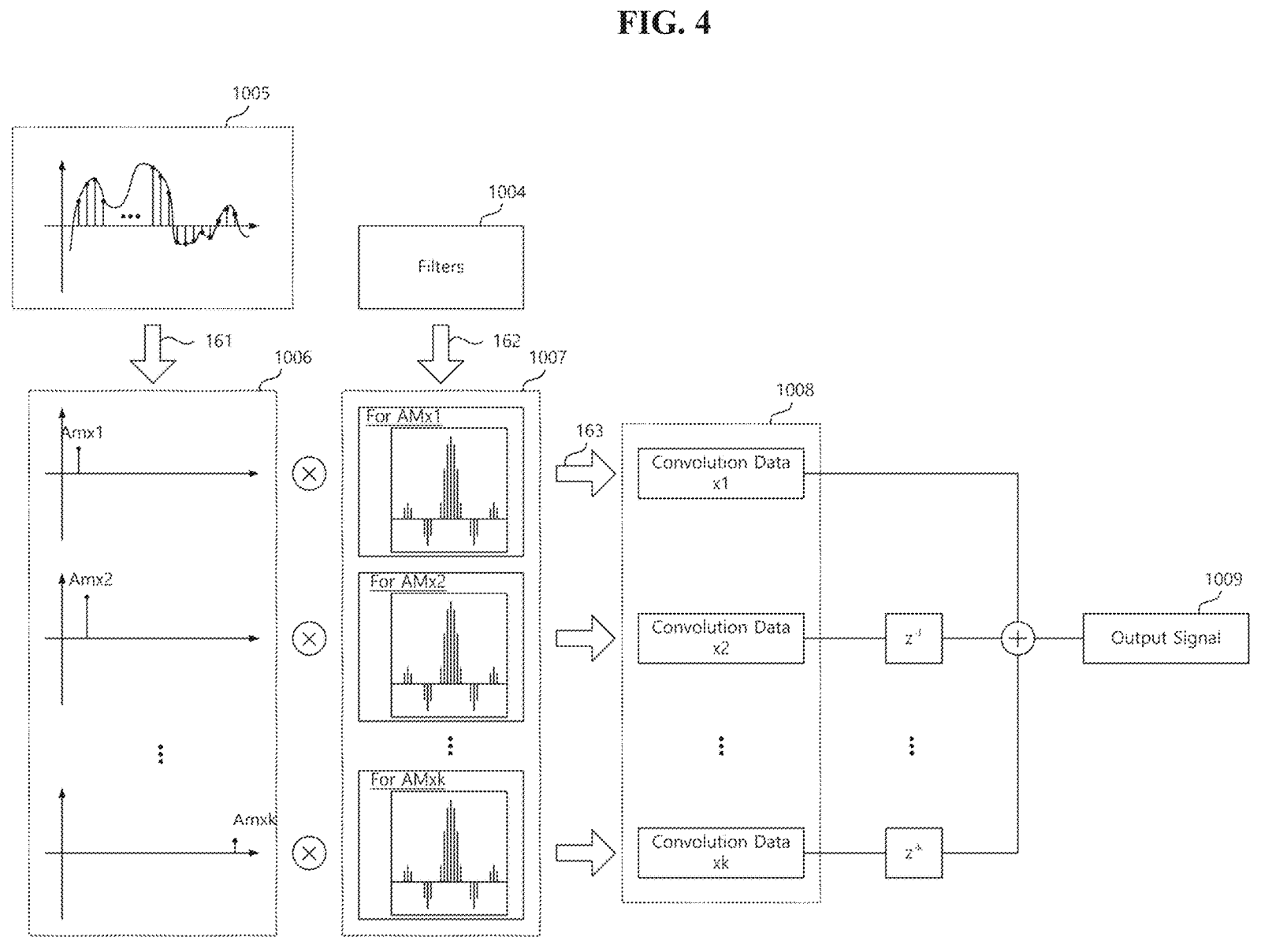

FIG. 4 is a diagram illustrating an operation of a modeling unit according to an embodiment of the present disclosure.

Referring to FIG. 4, the modeling unit 160 according to an embodiment calculates (161) the instantaneous amplitude in units of discrete time from an input signal 1005. A plurality of instantaneous signals 1006 each having an instantaneous amplitude value may be acquired according to the calculation result.

The modeling unit 160 searches (162) for one filter 1007 having the same amplitude value as the instantaneous amplitude value of one instantaneous signal from among the plurality of filters 1004. For example, when the instantaneous amplitude value of one instantaneous signal is $AM_{x1}$ as illustrated, the modeling unit 160 searches for the one filter 1007 having a size corresponding to $AM_{x1}$ among the plurality of filters 1004.

Thereafter, the modeling unit 160 performs a convolution 163 on one instantaneous signal 1006 and the one filter 1007 searched for corresponding thereto. According to the convolution, one piece of convolution data 1008 may be output. The modeling unit 160 may acquire the plurality of convolution data 1008 by sequentially performing the above-described operations 161 and 162 in the time domain with respect to the input signal 1005.

In this case, the modeling unit 160 may perform a delay operation on the convolution data 1008 acquired from instantaneous signals after the instantaneous signal having the first index in the time domain. For example, as illustrated, in the case of convolution data for an $AM_{x2}$ instantaneous signal positioned after the $AM_{x1}$ instantaneous signal, it may be delayed ($z^{-1}$) by one sample. Accordingly, the modeling unit 160 may delay ($z^{-k}$) the convolution data for an AMA instantaneous signal by one sample.

The modeling unit 160 may finally acquire a final output signal 1009 by adding all the delayed convolution data for each sample.

In an embodiment, the modeling unit 160 may acquire the final output signal 1009 through Equation 4.

$$y[n] = \sum_{i=0}^{M-1} x[n-i] \cdot \frac{1}{M} \sum_{f=0}^{M-1} S(|x[n-i]|, f) \cdot e^{j\left(\frac{2\pi f}{M}\right)i} \qquad \text{[Equation 4]}$$

Equation 4 may be understood as defining the IDFT 141 and the convolution operation 163 for the input signal of the modeling unit 160. Specifically, according to Equation 4, the modeling unit 160 may delay the instantaneous signal x[n−i] having the instantaneous amplitude value and the convolution data of the IDFT result according to Equation 3 by 'i' (here, 'i' is a natural number), and may acquire the output signal by adding all of the delayed convolution data together.

The modeling unit 160 may model the non-linear memory system based on the input signal 1005 and the acquired final output signal 1009. The non-linear memory system may be defined as a transfer function that is an input/output relationship between the input signal 1005 and the final output signal 1009, and may be defined by Equation 4 as an embodiment.

According to an embodiment, the non-linear memory system modeled through the modeling unit 160 has non-linearity and a memory effect like the MP model. The existing MP model is defined by Equation 5.

$$y[n] = \sum_{p=0}^{K-1} \sum_{i=0}^{M-1} a_{p,i} \cdot x[n-i] \cdot |x[n-i]|^p \qquad \text{[Equation 5]}$$

As is known, 'p' and 'i' are defined as the number of memory taps and the non-linear order, respectively. Equation 5 may be expressed as Equation 6 through the Inverse Discrete Fourier Transform (IDFT).

$$y[n] = \sum_{i=0}^{M-1} x[n-i] \cdot \frac{1}{M} \sum_{f=0}^{M-1} \left\{ \sum_{p=0}^{K-1} A_p[f] \cdot |x[n-i]|^p \right\} \cdot e^{j\left(\frac{2\pi f}{M}\right)i} \qquad \text{[Equation 6]}$$

Accordingly, it may be confirmed that the non-linear memory system model of the present disclosure expressed by Equation 4 is similar to the existing MP model expressed by Equation 6. That is, in the non-linear memory system model of the present disclosure, it is possible to design a model having non-linearity and memory effect without a training operation and the output of the non-linear memory system according to the actual modulated signal like the existing MP model.

Figure 5:
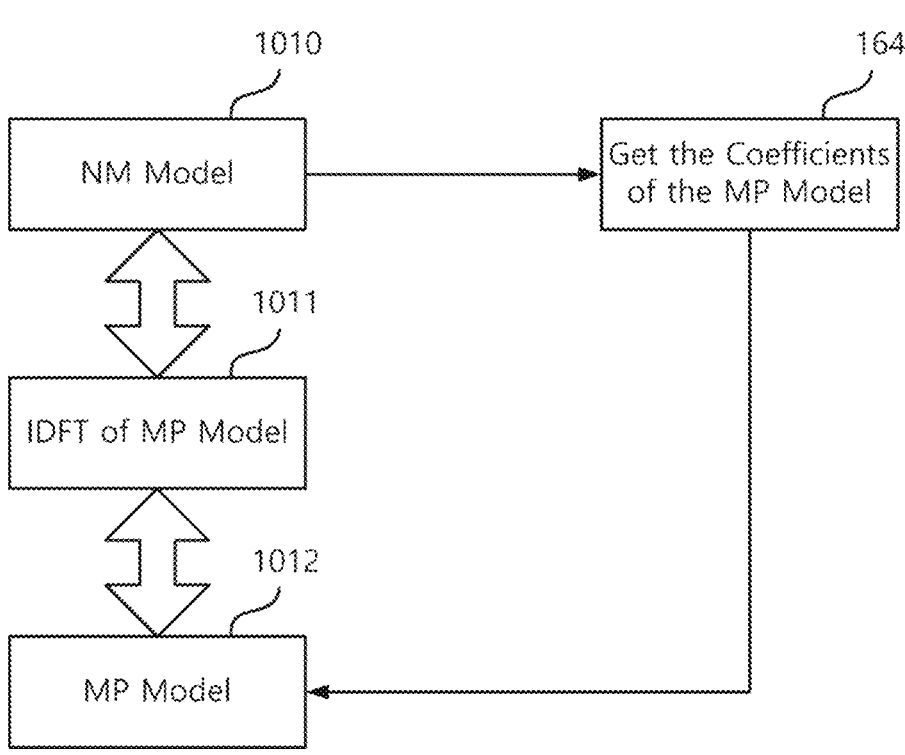
FIG. 5 is a diagram illustrating an operation of a modeling unit according to an embodiment of the present disclosure.

FIG. 5 is a diagram illustrating an operation of a modeling unit according to an embodiment of the present disclosure.

Referring to FIG. 5, the modeling unit 160 according to an embodiment acquires (164) coefficients of an MP model 1012 from a non-linear memory system model 1010 acquired according to the embodiments of the present disclosure. For example, the non-linear memory system model 1010 may be defined by Equation 4, the MP model 1012 may be defined by Equation 5, and an IDFT form 1011 of the MP model 1012 may be defined by Equation 6. Since the non-linear term of the non-linear memory system model 1010 and the non-linear term of the MP model 1012 have similar forms to each other, the non-linear memory system model 1010 is similar to the IDFT form 1011 of the MP model 1012.

Accordingly, the modeling unit 160 according to an embodiment models the non-linear memory system model 1010 based on Equation 4 and acquires $A_p[f]$, which is a coefficient of the MP model 1012, therefrom.

Hereinafter, a method of operating an electronic device according to the above-described embodiments of the present disclosure will be described.

Figure 6:
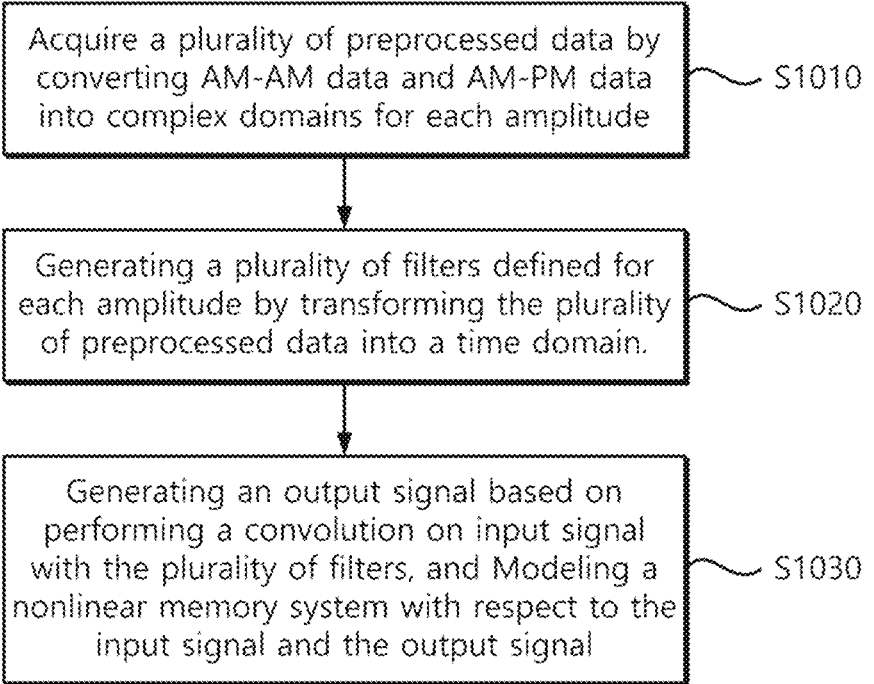
FIG. 6 is a flowchart of a method of operating an electronic device according to an embodiment of the present disclosure.

FIG. 6 is a flowchart of a method of operating an electronic device according to an embodiment of the present disclosure.

Referring to FIG. 6, the electronic device 100 first converts the AM-AM data and AM-PM data 1001 into the complex domains for each amplitude to acquire the plurality of preprocessed data 1003 (S1010). According to an embodiment, the electronic device 100 may convert the AM-AM data and AM-PM data 1001 into the complex domain for each amplitude through sweeps in the frequency domain and sweeps in the amplitude domain, or may directly convert them into the complex domain.

The electronic device 100 converts the plurality of preprocessed data 1003 acquired through operation S1010 into the time domain to generate the plurality of filters 1004 defined for each amplitude (S1020). The conversion into the time domain may be performed, for example, through the IDFT or the IFFT, and the IDFT or the IFFT may be performed on each of the plurality of preprocessed data 1003.

The electronic device 100 performs a convolution on the input signal with the plurality of filters 1004 generated in operation S1020 to generate the output signal, and models the non-linear memory system with respect to the input signal and the output signal (S1030).

FIG. 7 is a flowchart of a preprocessing operation according to an embodiment of the present disclosure.

FIG. 7 may be included in operation S1010 of FIG. 6. Referring to FIG. 7, the electronic device 100 sweeps the AM-AM data and AM-PM data 1001, respectively, in the frequency domain, to obtain AM-AM sweep data defined for each frequency and AM-PM sweep data defined for each frequency (S1011). Operation S1011 may be performed for each preset frequency sweep unit with respect to a preset frequency period. The AM-AM sweep data and AM-PM sweep data 1002 generated through operation S1011 may be acquired as many times as the number corresponding to the preset frequency period.

The electronic device 100 sweeps the AM-AM sweep data and AM-PM sweep data 1002 acquired through operation S1011 in the amplitude domain to acquire the plurality of preprocessed data 1003 (S1012). Operation S1012 may also be performed for each preset amplitude sweep unit with respect to a preset amplitude period. The plurality of preprocessed data 1003 generated through operation S1012 may be acquired as many times as the number corresponding to the preset amplitude period.

FIG. 8 is a flowchart of a modeling operation according to an embodiment of the present disclosure.

FIG. 8 may be included in operation S1030 of FIG. 6. Referring to FIG. 8, the electronic device 100 calculates an amplitude for each discrete time from the input signal (S1031). The input signal may be, for example, a modulated signal having a bandwidth. The electronic device 100 may acquire an instantaneous signal by calculating an instantaneous amplitude value of the input signal for each discrete time in the time domain.

The electronic device 100 extracts one filter corresponding to the amplitude for each discrete time from among the plurality of filters 1004 (S1032). The electronic device 100 searches for the plurality of filters 1004 and extracts one filter having the same amplitude value as the instantaneous amplitude value of the instantaneous signal acquired in operation S1031.

The electronic device 100 performs a convolution on the one filter extracted through operation S1032 with the amplitude for each discrete time (S1033). The plurality of convolution data may be acquired through the convolution, and the electronic device 100 may finally acquire an output signal by adding all of the convolution data together acquired by delaying each convolution data according to the instantaneous signal.

Hereinafter, application examples of various embodiments of the present disclosure described above will be described.

Figure 9:
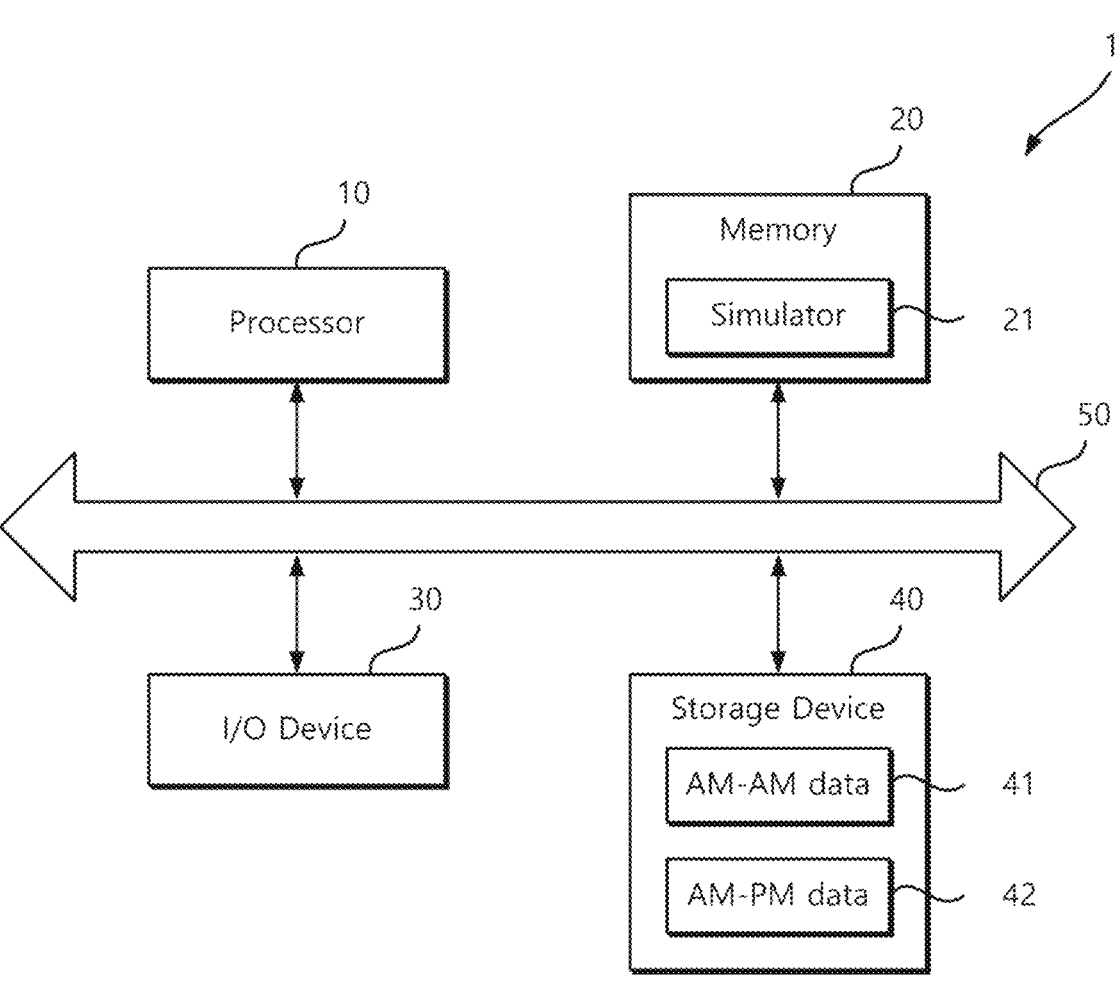
FIG. 9 is a diagram illustrating an electronic system according to an embodiment of the present disclosure.

FIG. 9 is a diagram illustrating an electronic system according to an embodiment of the present disclosure.

Referring to FIG. 9, an electronic system 1 according to an embodiment includes a processor 10, a memory 20, an input/output device 30, a storage device 40, and a bus 50. The processor 10, the memory 20, the input/output device 30, and the storage device 40 may be connected to one another through the bus 50.

The processor 10 may control the overall operation of the electronic system 1, specifically, the operation of components included in the electronic system 1. The processor 10 may execute software (e.g., an application program, an operating system, or device drivers) to be executed in the electronic system 1. The processor 10 may execute an operating system loaded into the memory 20 or various application programs to be driven based on the operating system.

The operating system or the application programs may be loaded into the memory 20. All input/output operations of the electronic system may be supported by the operating system. In addition, application programs selected by a user or for providing basic services may be loaded into the memory 20. For example, a simulator 21 implemented to execute the operations of the above-described embodiments may be loaded, and the processor 10 may execute the simulator 21 loaded into the memory 20.

The simulator 21 according to an embodiment may perform operations of at least one of the data preprocessing unit 120, the filter generating unit 140, and the modeling unit 160 illustrated in FIG. 1. For example, the simulator 21 may acquire the plurality of preprocessed data by converting AM-AM data 41 and the AM-PM data 42 stored in the storage device 40 into a complex domain for each amplitude. For example, the simulator 21 may convert the plurality of preprocessed data into the time domain to generate the plurality of filters defined for each amplitude. For example, the simulator 21 may generate an output signal by performing the convolution on an input signal with the plurality of filters, and may model a non-linear memory system with respect to the input signal and the output signal.

The input/output device 30 may receive a user input from user interface devices or may output data generated through the electronic system 1. The input/output device 30 may be, for example, a touch pad, a keypad, a keyboard, a mouse, and/or a microphone.

The storage device 40 may function as a non-volatile storage device that stores data regardless of whether power is supplied or not. As an embodiment, the storage device 40 may store the AM-AM data 41 and the AM-PM data 42 according to the above-described embodiments.

The storage device 40 may include, for example, a non-volatile memory such as an Electrically Erasable Programmable Read-Only Memory (EEPROM), flash memory, a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), and a Ferroelectric Random Access Memory (FRAM), or may include a storage medium such as a magnetic tape, an optical disk, and a magnetic disk. Also, the storage device 40 may be detachable from the electronic system 1. The storage device 40 may be a device to which a standard protocol such as a universal flash storage (UFS), an embedded multimedia card (eMMC), or a non-volatile memory express (NVMe) is applied, but is not limited thereto.

According to the electronic system 1 according to the above-described embodiment, the present disclosure may predict the output signal through the AM-AM data 41 and the AM-PM data 42 without inputting a modulated signal to an actual device of a non-linear memory system such as a power amplifier, as an example.

Figures 10, 11:
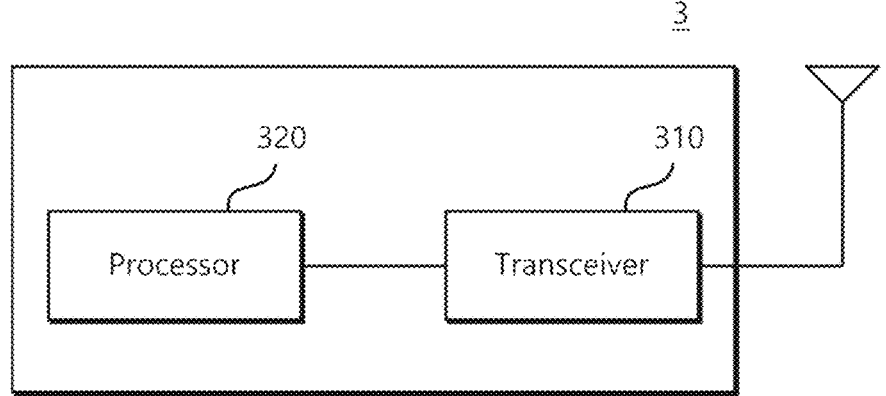
FIG. 10 is a diagram illustrating an electronic system according to an embodiment of the present disclosure.
FIG. 11 is a diagram illustrating an electronic system according to an embodiment of the present disclosure.

FIG. 10 is a diagram illustrating an electronic system according to an embodiment of the present disclosure.

Referring to FIG. 10, an electronic system 2 according to an embodiment includes the electronic device 100, a predistorter (PD) 220, a power amplifier (PA) 240, and a PD identifier 260.

The electronic device 100 may generate an output signal of the non-linear memory system (a power amplifier in FIG. 10) according to the above-described embodiments, and may model the non-linear memory system. In the case of FIG. 10, the electronic device 100 generates an output signal of the PA 240 from a predistorted signal of an input signal based on the AM-AM data and the AM-PM data, and models a PA model from the output signal of the PA 240.

The PD 220 is provided at an input terminal of the PA 240 and predistorts an input signal x[n] based on the predistortion coefficient to generate a predistortion signal z[n]. The PD 220 may be implemented by a signal generator. The predistortion operation of the PD 220 may refer to a technique of predistorting the input signal x[n] according to the non-linearity opposite to the non-linear characteristic of the PA 240. According to the predistortion, the non-linearity of the PA 240 may be compensated.

The PA 240 is connected to an output terminal of the PD 220, and amplifies the power of the predistortion signal z[n], which is an output signal of the PD 220, to generate an output signal y[n]. Since the PA 240 has the non-linear characteristic as described above, the output signal may be distorted when there is no non-linearity compensation operation such as the predistortion operation, but the distortion may be compensated through the PD 220.

The PD identifier 260 inversely transforms the PA model received from the electronic device 100 to generate a PD model, and transfers the PD model to the PD 220. For example, the inverse transform may be performed based on the coefficients of the PA model. The PD identifier 260 may be implemented by a logic circuit.

The electronic system 2 according to an embodiment described above may model the PA model for a power amplifier, which is a representative example of a non-linear memory system, based on the AM-AM data and the AM-PM data. Accordingly, predistortion modeling is possible without actually feeding back the output signal of the PA as in the conventional PD architecture.

FIG. 11 is a diagram illustrating an electronic system according to an embodiment of the present disclosure.

Referring to FIG. 11, an electronic system 3 according to an embodiment includes a transceiver 310 and a processor 320.

The transceiver 310 transmits and receives a radio signal. The processor 320 is electrically connected to the transceiver 310 to control the transceiver 310 or performs operations for controlling the transceiver 310.

The processor 320 may control the transceiver 310, and may be configured to implement the descriptions, functions, procedures, proposals, methods, and/or operational flowcharts of the present disclosure. For example, the processor 320 may receive a signal through the transceiver 310 and store information included in the signal or data in a memory. In addition, the processor 320 may generate a signal by processing information stored in the memory, and then transmit the generated signal through the transceiver 310. The processor 320 may execute some or all of the processes controlled by the processor 320, or may execute various embodiments of the present disclosure, based on the memory in which the software code is stored, which includes instructions for performing a description, a function, a procedure, a proposal, a method, and/or an operation flowchart in the present disclosure.

The processor 320 according to an embodiment may perform operations of at least one of the data preprocessing unit 120, the filter generating unit 140, and the modeling unit 160 illustrated in FIG. 1. For example, the processor 320 may acquire the plurality of preprocessed data 1003 by converting the AM-AM data and AM-PM data 1001 stored in the storage device into the complex domain for each amplitude. For example, the processor 320 may generate the plurality of filters 1004 defined for each amplitude by converting the plurality of preprocessed data 1003 into the time domain. For example, the processor may generate an output signal by performing the convolution on the input signal with the plurality of filters 1004, and may model a non-linear memory system with respect to the input signal and the output signal. The modeled non-linear memory system may be used for the predistortion of the transceiver 310 as described above. Accordingly, the processor may perform a predistortion compensation operation based on the modeled non-linear memory system.

According to an embodiment of the present disclosure, an electronic device capable of generating and modeling an output signal of a non-linear memory system without actually outputting the non-linear memory system and an operating method thereof may be provided.

The above descriptions are specific embodiments for carrying out the present disclosure. Embodiments in which a design is changed slightly may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a processor configured to:
  convert amplitude modulation (AM)-AM data representing magnitudes of first input signals and first output signals and AM-phase modulation (PM) data representing the magnitudes of the first input signals and phases of the first output signals into complex domains for each of a plurality of different amplitudes to generate a plurality of preprocessed data parts;
convert the plurality of preprocessed data parts into a time domain to generate a plurality of filters for each of the plurality of different amplitudes; and
  perform a convolution on a second input signal with the plurality of filters to generate a second output signal, and to model a non-linear memory system using the second input signal and the second output signal,
  wherein the processor calculates an amplitude for each discrete time from the second input signal, and extracts one filter corresponding to the amplitude for the each discrete time from among the plurality of filters, and
  wherein the processor generates a plurality of convolution data by performing a convolution on the amplitude for the each discrete time and the one filter, delays the plurality of convolution data by a specific sample period according to positions in a discrete time domain, and generates the second output signal by adding the plurality of delayed convolution data together.

2. The electronic device of claim 1, wherein the processor sweeps each of the AM-AM data and the AM-PM data in a frequency domain to acquire AM-AM sweep data for each of a plurality of different frequencies and AM-PM sweep data for each of the plurality of different frequencies, and sweeps the AM-AM sweep data and the AM-PM sweep data in an amplitude domain to acquire the plurality of preprocessed data parts.

3. The electronic device of claim 1, wherein the processor converts the plurality of preprocessed data parts into the time domain through an Inverse Fast Fourier Transform (IFFT).

4. The electronic device of claim 1, wherein the plurality of filters are Finite Impulse Response (FIR) filters.

5. The electronic device of claim 1, wherein the AM-AM data and the AM-PM data are acquired from a signal having a one-tone frequency.

6. The electronic device of claim 1, wherein the processor determines a coefficient of a Memory Polynomial (MP) model from the non-linear memory system.

7. A method for modeling a non-linear memory system, the method comprising:
  acquiring a plurality of preprocessed data parts by converting amplitude modulation (AM)-AM data representing magnitudes of first input signals and first output signals and AM-phase modulation (PM) data representing the magnitudes of the first input signals and phases of the first output signals into complex domains for each of a plurality of different amplitudes;
  generating a plurality of filters for each of the plurality of different amplitudes by converting the plurality of preprocessed data into a time domain; and
  generating a second output signal by performing a convolution on a second input signal with the plurality of filters; and
  modeling the non-linear memory system using the second input signal and the second output signal,
  wherein the modeling of the non-linear memory system further comprises:
    calculating an amplitude for each discrete time from the second input signal;
    extracting one filter corresponding to the amplitude for the each discrete time from among the plurality of filters;
    generating a plurality of convolution data by performing a convolution on the amplitude for the each discrete time and the one filter;
    delaying the plurality of convolution data by a specific sample period according to positions in a discrete time domain; and
    generating the second output signal by adding the plurality of delayed convolution data together.

8. The method of claim 7, wherein the acquiring of the plurality of preprocessed data parts comprises:
  sweeping each of the AM-AM data and the AM-PM data in a frequency domain to acquire AM-AM sweep data for each of a plurality of different frequencies and AM-PM sweep data for each of the plurality of different frequencies; and
  acquiring the plurality of preprocessed data parts by sweeping the AM-AM sweep data and the AM-PM sweep data in an amplitude domain.

9. The method of claim 7, wherein the generating of the plurality of filters comprises converting the plurality of preprocessed data parts into the time domain through an Inverse Fast Fourier Transform (IFFT).

10. The method of claim 7, wherein the plurality of filters are Finite Impulse Response (FIR) filters.

11. The method of claim 7, wherein the AM-AM data and the AM-PM data are acquired from a signal having a one-tone frequency.

12. An electronic system comprising:
a transceiver; and
a processor connected with the transceiver, and
wherein the processor is configured to:
  acquire a plurality of preprocessed data parts by converting amplitude modulation (AM)-AM data representing magnitudes of first input signals and first output signals and AM-phase modulation (PM) data representing the magnitudes of the first input signals and phases of the first output signals into complex domains for each of a plurality of different amplitudes;

generate a plurality of filters for each of the plurality of different amplitudes by converting the plurality of preprocessed data parts into a time domain;

generate a second output signal of the transceiver by performing a convolution on a second input signal with the plurality of filters; and model a non-linear memory system using the second input signal and the second output signal, and wherein the processor is further configured to:

calculate an amplitude for each discrete time from the first input signals, extract one filter corresponding to the amplitude for the each discrete time from among the plurality of filters, and perform a convolution on the amplitude for the each discrete time and the one filter.

13. The electronic system of claim 12, wherein the processor is configured to:

sweep each of the AM-AM data and the AM-PM data in a frequency domain to obtain AM-AM sweep data defined for each of a plurality of different frequencies and AM-PM sweep data defined for each of the plurality of different frequencies, and sweep the AM-AM sweep data and the AM-PM sweep data in an amplitude domain to acquire the plurality of preprocessed data parts.

14. The electronic system of claim 12, wherein the processor is configured to:

convert the plurality of preprocessed data into the time domain through an Inverse Fast Fourier Transform (IFFT).

15. The electronic system of claim 12, wherein the plurality of filters are Finite Impulse Response (FIR) filters.

* * * * *